Sept. 18, 1962   W. K. FRENCH   3,054,203
DISPLAY DEVICE

Filed Aug. 12, 1959   9 Sheets-Sheet 1

INVENTOR
WALTER K. FRENCH
BY
ATTORNEY

Sept. 18, 1962    W. K. FRENCH    3,054,203
DISPLAY DEVICE
Filed Aug. 12, 1959    9 Sheets-Sheet 2

Sept. 18, 1962     W. K. FRENCH     3,054,203
DISPLAY DEVICE
Filed Aug. 12, 1959     9 Sheets-Sheet 3

Sept. 18, 1962   W. K. FRENCH   3,054,203
DISPLAY DEVICE
Filed Aug. 12, 1959   9 Sheets-Sheet 4

Sept. 18, 1962   W. K. FRENCH   3,054,203
DISPLAY DEVICE

Filed Aug. 12, 1959   9 Sheets-Sheet 5

Sept. 18, 1962     W. K. FRENCH     3,054,203
DISPLAY DEVICE

Filed Aug. 12, 1959     9 Sheets-Sheet 6

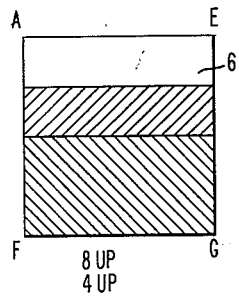
FIG.10a
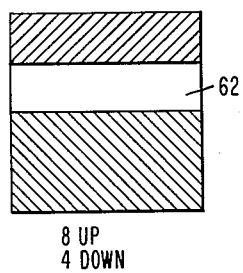
FIG.10b
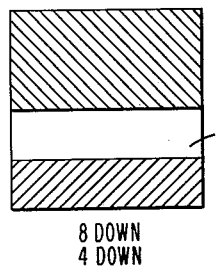
FIG.10c
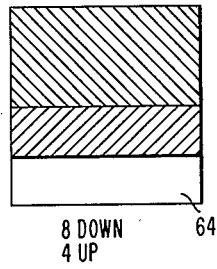
FIG.10d
8 UP
4 UP
8 UP
4 DOWN
8 DOWN
4 DOWN
8 DOWN
4 UP
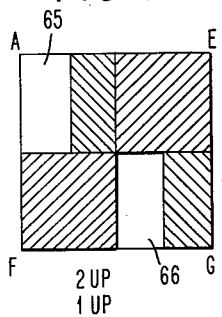
FIG.11a
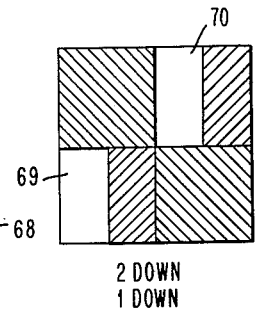
FIG.11b
FIG.11c
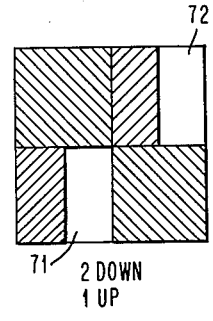
FIG.11d
2 UP
1 UP
2 UP
1 DOWN
2 DOWN
1 DOWN
2 DOWN
1 UP
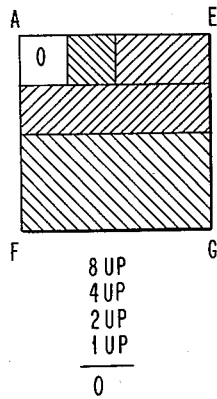
FIG.12a
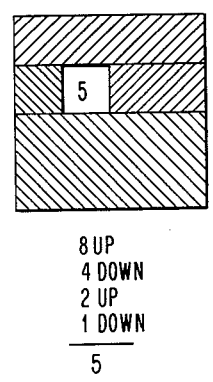
FIG.12b
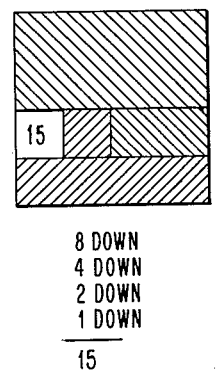
FIG.12c
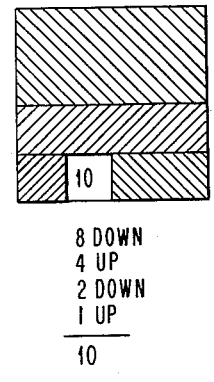
FIG.12d
8 UP
4 UP
2 UP
1 UP
---
0
8 UP
4 DOWN
2 UP
1 DOWN
---
5
8 DOWN
4 DOWN
2 DOWN
1 DOWN
---
15
8 DOWN
4 UP
2 DOWN
1 UP
---
10

Sept. 18, 1962     W. K. FRENCH     3,054,203
DISPLAY DEVICE

Filed Aug. 12, 1959     9 Sheets-Sheet 9

United States Patent Office 3,054,203
Patented Sept. 18, 1962

3,054,203
DISPLAY DEVICE
Walter K. French, Poughkeepsie, N.Y., assignor to International Business Machines Corporation, New York, N.Y., a corporation of New York
Filed Aug. 12, 1959, Ser. No. 833,312
7 Claims. (Cl. 40—28)

This invention relates to display devices, and more particularly, to character display devices.

The display device of the present invention should find usefulness in various scientific and commercial applications where it is desired to translate alphabetic, numeric, or special characters represented by mechanical or electrical means into their conventional and visibly recognizable form for direct reading or observation.

In a typical application, a number of display devices of the type disclosed herein might be attached to electronic computers or other business machines for visually and directly displaying characters selected from certain positions in associated storage or memory units.

In another application, the present display device might be incorporated in billboards, time-and-temperature boards or similar advertising media.

Another application for the device might be in visual signalling applications, such as those used by naval forces from ship to ship, ship to shore, or by ground and air forces between tactical units or aircraft.

Other applications for the present device will become apparent besides those mentioned.

A number of devices exist in the prior art for displaying characters. Some of the more familiar ones are the following.

One display device in the prior art comprises a matrix of lights which may be individually and selectively energized by electrical set up and impulse means for forming the outline of a character. Representative of this group are the "time and temperature" or "moving light billboard" displays.

Another group of prior art devices for displaying characters contemplates a single light source which is directed toward a plurality of movable plates arranged in a stack each of which has a particular character outline thereon, and each of which may be displayed by displacing it from the common stack so that it alone is properly positioned for direct observation.

Another category of prior art display devices contemplates a light source directed toward a stack of overlapping movable plates, each of which is perforated or cut out in selected areas and selected ones of which may be concurrently displaced into a position for machine reading by photo sensing or other means. No character recognizable by a person is formed by devices in this category and the perforations are arranged in an unrelated manner, not suitable for translating characters from their coded form without some kind of intermediate decoding means.

Other display devices of the prior art have utilized a common light directed toward an observer through character forming plates having sections made up of polarized material for control of the light passing through the plates, one plate being required for each character.

Various types of selectively actuated character display devices, other than those mentioned, have existed in the prior art including those which utilize electroluminescent means, those which provide replaceable cards for translation purposes rather than fixed plates and those based on stereoscopic principles.

In general, the selection of plates or actuation of the setup means in prior art devices for displaying a particular character have had no logical or definable relationship to the selection or actuation required for displaying another particular character.

In addition, devices of the prior art, like those mentioned, have required complex relay or electronic circuit means for translating electrical or mechanical machine representations of characters into their visual counterparts.

Certain of the prior art devices mentioned have provided a machine recognizable pattern only and have not been capable of modification for displaying a character which might be in a form recognizable by a human observer.

Therefore, an object of the invention is to provide a character display device which has simplified set-up means.

Another object of the invention is to provide a character display device wherein a logical and functional relationship exists between the set-up arrangement for any particular character and the set-up arrangement for all other characters.

A further object of the invention is to provide a character display device which may be set up directly by electrical or character representing impulses or mechanical character representing means without requiring intermediate decoding means.

A still further object of the invention is to provide a character display device which may be set up under machine control or by manual manipulation.

An additional object of the invention is to provide a character display device which is easily modified for displaying conventional characters in various languages or for displaying visual cryptographic representations of these characters.

Another object of the invention is to provide a character display device which may, with slight modification, be constructed to display a small number of characters or a large number of characters, depending on requirements.

Another object of the invention is to provide a character display device which will display alphabetic characters, and numeric characters, as well as special characters.

A still further object of the invention is to provide a character display device which may be set up according to various codes and which will display the conventional character corresponding to the code arrangement selected.

A still further object of the invention is to provide a display device which may be directly set up according to any one of a plurality of character representations and which will display conventional characters corresponding to such representations.

In the present invention, a display device is contemplated wherein a plurality of set up means are provided which respectively represent each digital position within a character representing code and wherein the set up means may be directly positioned according to the configuration of a particular character representation to establish a light path matrix associated only with that particular representation and wherein further means are provided to form a recognizable character from any established light path matrix.

The foregoing and other objects, features and advantages of the invention will be apparent from the following more particular description of preferred embodiments of the invention, as illustrated in the accompanying drawings.

Figure 1:
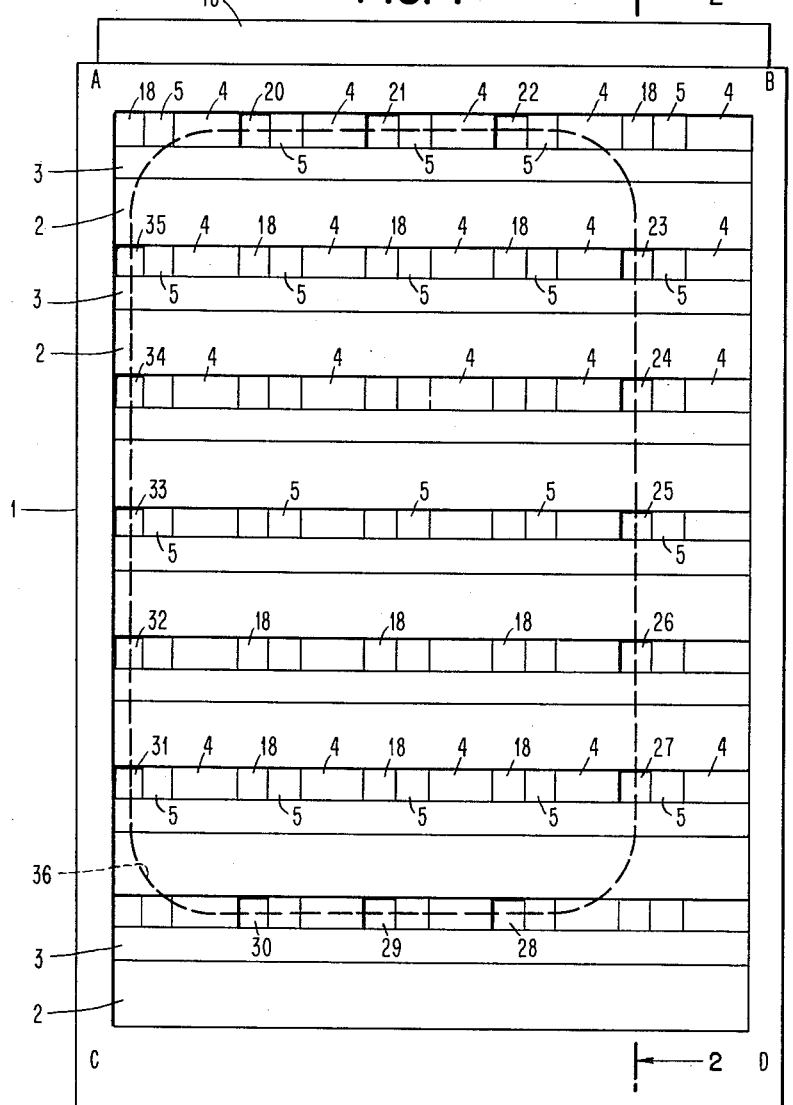
FIG. 1 depicts one embodiment of the invention.
Figure 1:
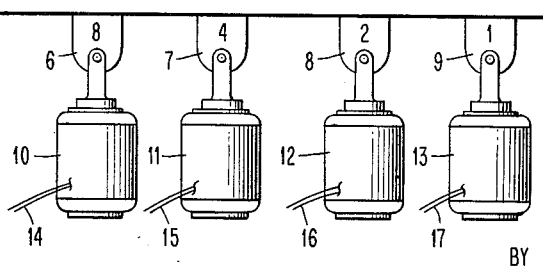
Figure 3A:
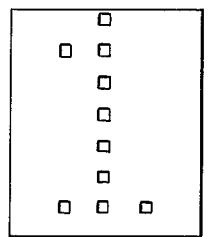

FIG. 3a, b, c, d, and e illustrate typical characters which may be displayed by the device of FIG. 1.

Figure 4:
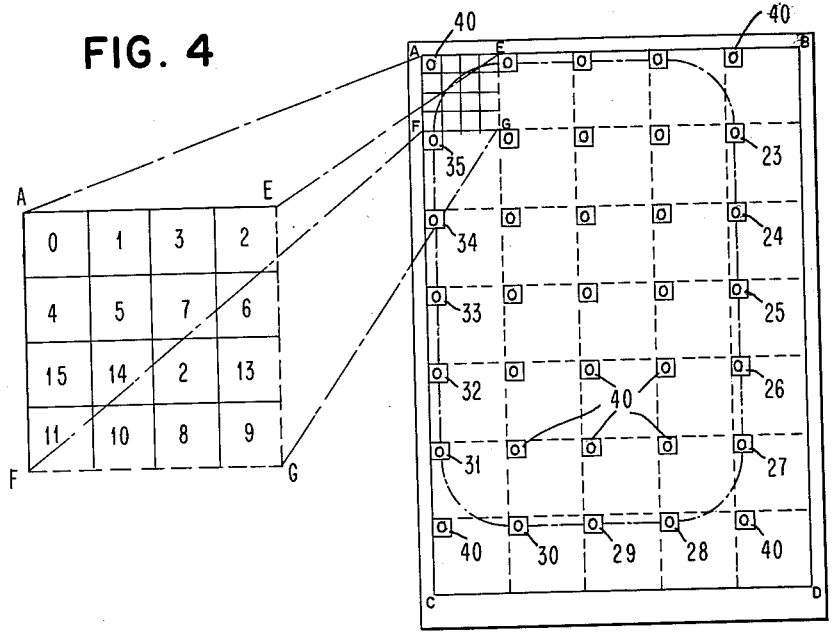

FIG. 4 is a diagrammatical illustration of the principle on which the device of FIG. 1 is based.

FIGS. 5, 6, 7, 8, respectively, illustrate preferred forms of code set up plates used in the device of FIG. 1.

Figure 9:
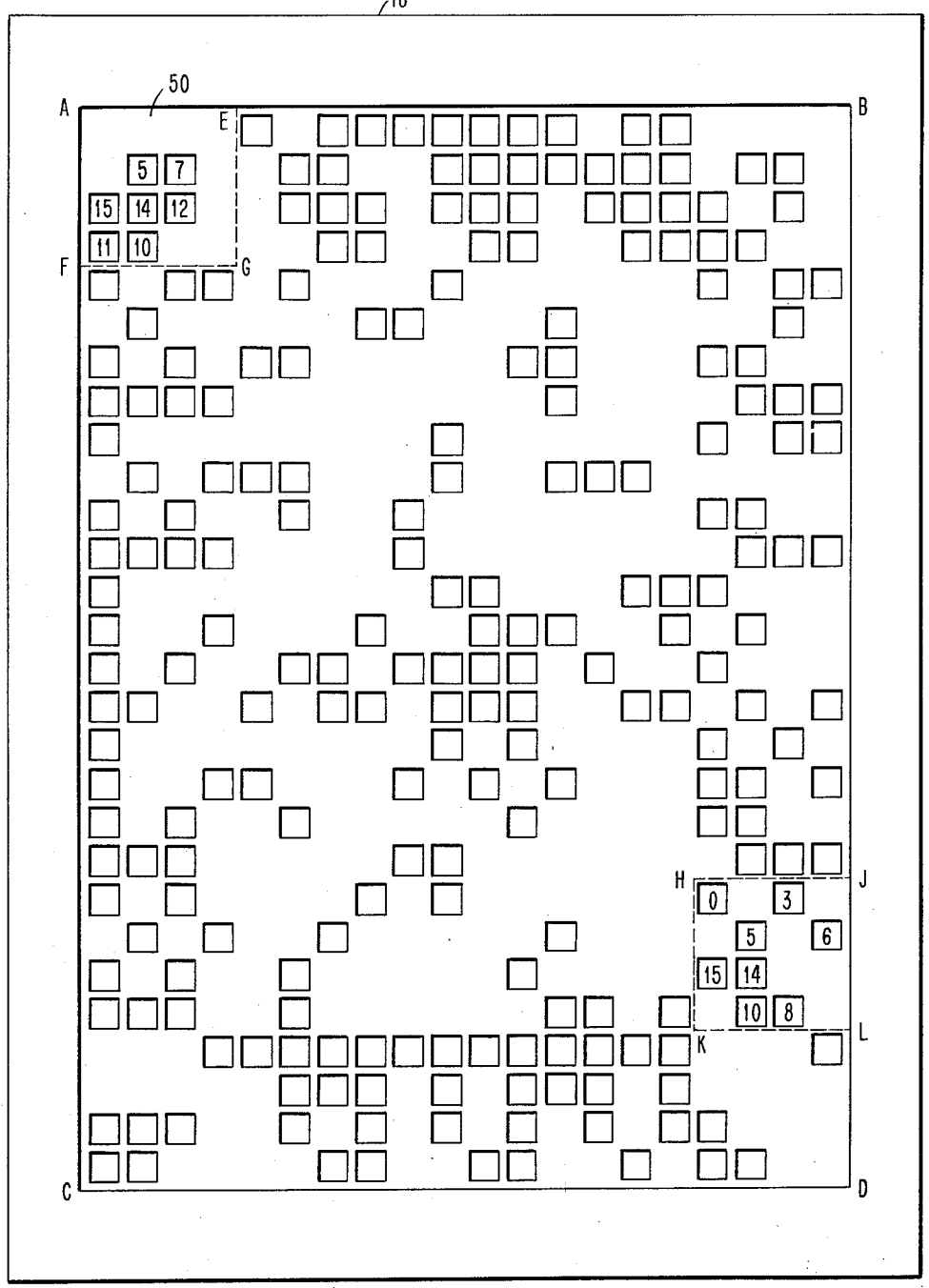

FIG. 9 depicts a typical code mask which may be inserted in the device of FIG. 1.

FIGS. 10, 11 and 12 further illustrate the principle of operation of the device of FIG. 1.

Figure 13:
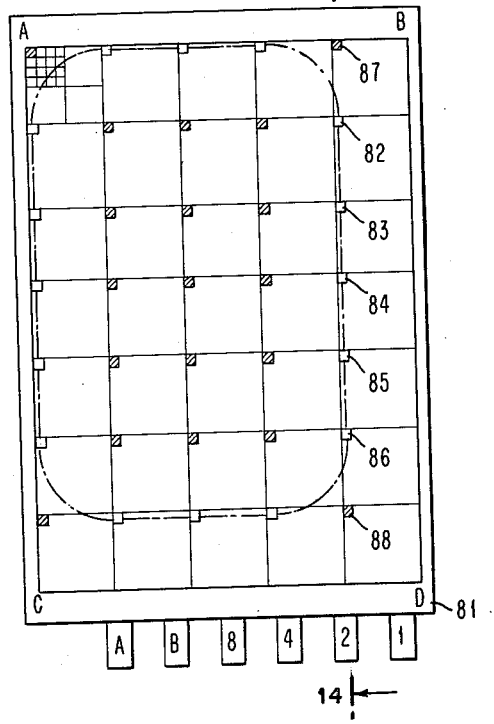

FIG. 13 represents a second embodiment of the invention.

Figure 14:
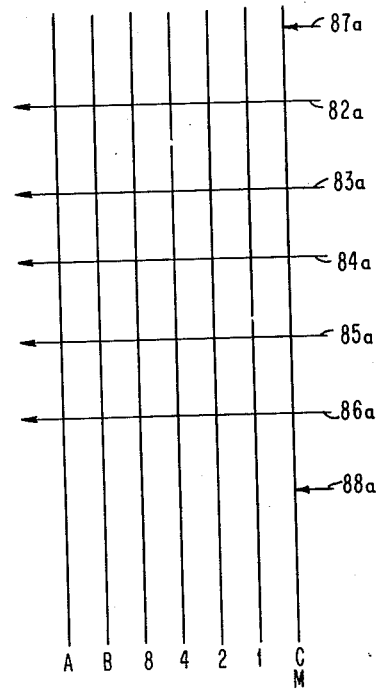

FIG. 14 is a diagrammatical cross sectional view of the device of FIG. 13.

Figure 15:
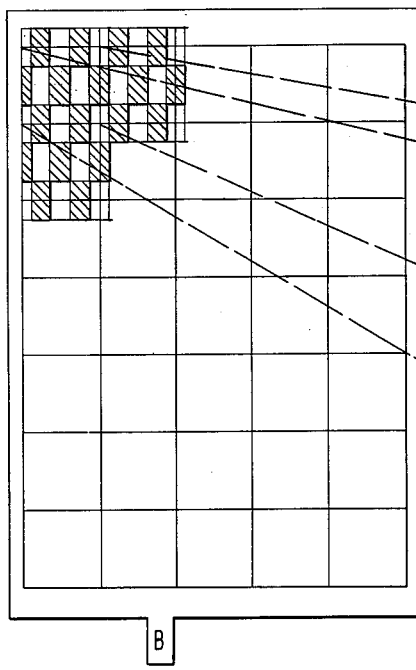
Figure 15:
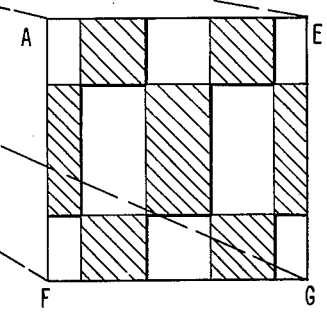
Figure 16:
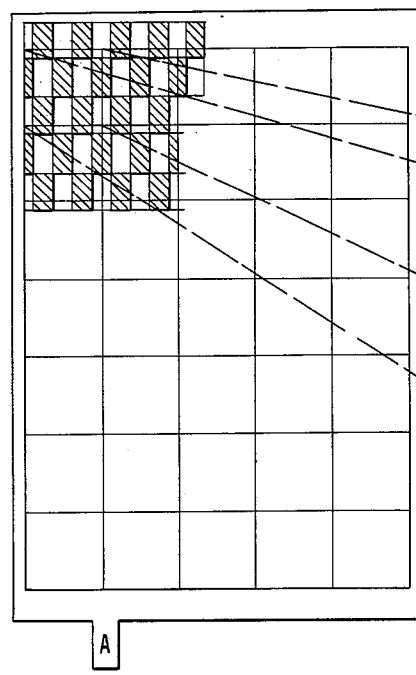
Figure 16:
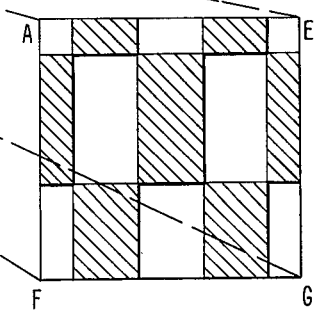

FIG. 15, and FIG. 16 respectively, depict two additional code set up plates which are incorporated in the device of FIG. 13.

Figure 17:
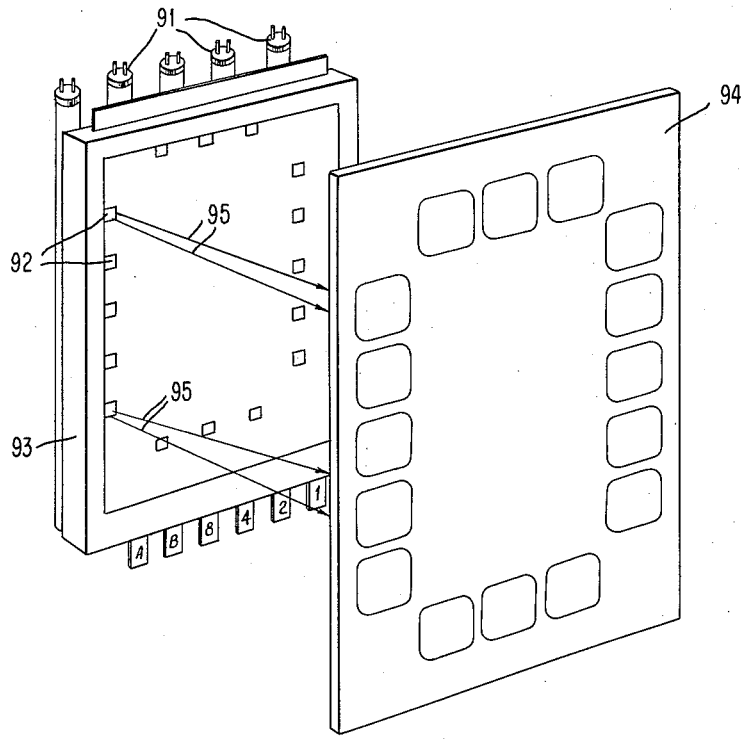

FIG. 17 illustrates a third embodiment of the invention.

Figure 18:
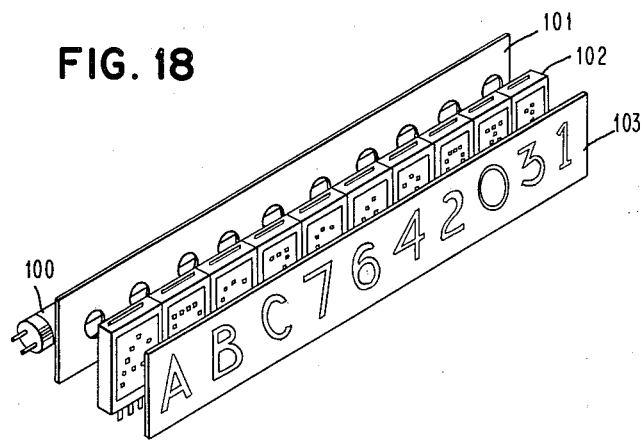

FIG. 18 represents another embodiment of the invention.

A preferred embodiment of the present invention is shown in FIG. 1. The device of FIG. 1 comprises a housing 1 which has a display area ABCD. Four overlapping code plates 2, 3, 4 and 5, portions of each of which may be seen within the display area ABCD, are contained within the housing 1.

Referring to FIG. 1, and to FIG. 2, which is a cross-sectional side view of the embodiment shown in FIG. 1 along the line 2—2, each of the plates 2, 3, 4 and 5 has a portion which extends below the housing 1, respectively numbered 6, 7, 8 and 9.

In addition, for purposes of this discription, the respective plates 2, 3, 4 and 5 and their associated extensions have been given binary coded decimal designations "8," "4," "2" and "1," which are well known in the art. These latter designations will be used in the discussion which follows.

It will become apparent to those skilled in the art that code representations other than "8," "4," "2" or "1" may be assigned to the respective plates, depending on the particular character display requirements.

Thus, other well known codes, such as the "5, 2, 2, 1," the "excess three," the "two-out-of-five," or others may be simply and directly translated into conventional characters by means of devices based on the principles disclosed herein.

Figure 2:
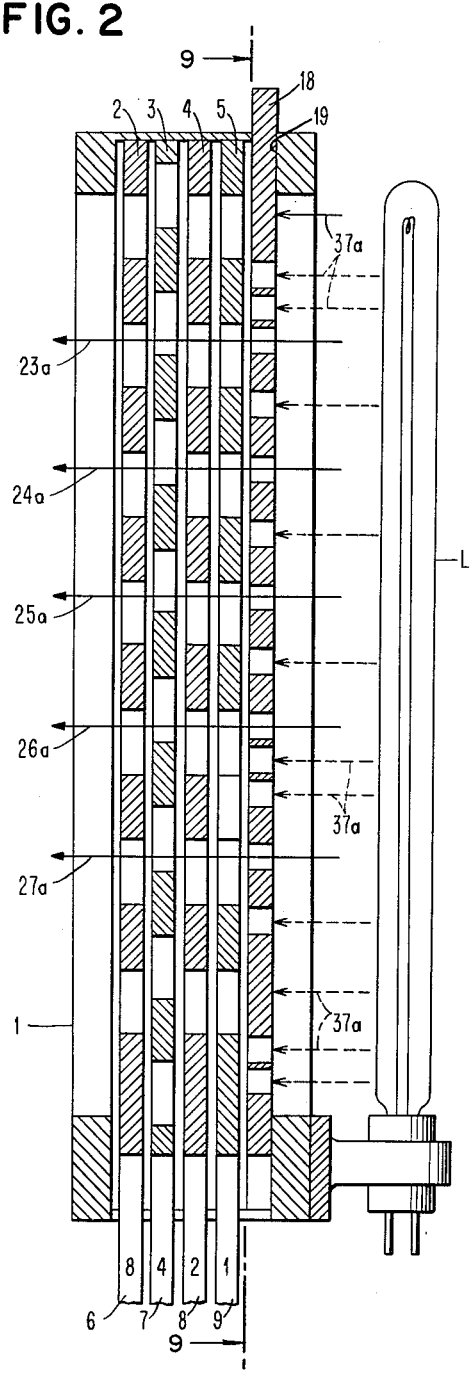
FIG. 2 is a cross sectional view of the device of FIG. 1 along the line 2—2.

In the embodiment shown in FIG. 1 and FIG. 2, each of the plates 8, 4, 2 and 1 is arranged within the housing 1 so that it may be slidably moved between an upper "home" position, and a lower "actuated" position. In FIG. 1, individual solenoids 10, 11, 12 and 13 are respectively attached by means of movable links to the "8," "4," "2" and "1" code plates.

Each of the solenoids 10, 11, 12, or 13 may be selectively energized by means of electrical impulses directed through respectively associated pairs of wires 14, 15, 16 and 17, in a manner known in the art. In the embodiment shown, when a particular solenoid is energized, its link will be drawn downward, and since each link is attached to a particular code plate, that particular code plate will also move downward to its "actuated" position. It is apparent that the positioning of the code plates may be performed manually, or that mechanical actuating means might be used in place of the solenoids.

In adition to the "8," "4," "2," "1" plates, a code mask 18, is contained within the housing 1. In the embodiment shown, the code mask 18 may be inserted into or removed from the housing 1 through a slot 19. With this arrangement, various other code masks might be readily inserted in the device for displaying diverse groups of characters, or for displaying characters according to a cryptographic scheme.

In FIG. 2, a light source "L" is shown positioned on the rearward side of the display device, that is, the side opposite the display area ABCD, shown in FIG. 1.

With the code mask 18 fully inserted in the device and with all the code plates "8," "4," "2" and "1" in their restored or home positions, the numeric zero ("0") or alphabetic capital "0" will be formed by light from the light source L passing through selected openings in the code plates and the code mask. This is the condition shown in FIG. 1, and the character "0" is readily discernible. Its outline is generally indicated by the small open squares 20 through 35 which are intersected by the dashed line 36 and the section line 2—2. For purposes of this description, the various portions of the plates 8, 4, 2 and 1 have been outlined in FIG. 1 to show their positional relationships with respect to one another when they are all in a restored condition. In actual practice, each of the code plates would be composed of the same kind of opaque material, with openings arranged in a particular manner, and in that case, the individual plates would blend together and would form a darkened display area ABCD, except for any established small light squares such as the squares 20 through 35.

In actual practice then, the character "0" in FIGURE 1 would stand out in sharp contrast to a darkened background display area ABCD formed by the overlapping plates.

In the particular embodiment shown, other characters may be formed when selected ones of the 8, 4, 2, and 1 plates are moved to their actuated positions by energizing the associated solenoids. This is done, for purposes of illustrating the novelty of the present invention, by actuating the plates according to a binary coded decimal or B.C.D. representation of the character it is desired to display.

The B.C.D. representations of numeric characters are well known but are listed here with their corresponding decimal equivalents for ready reference.

*Table I*

| Numerical Character: | B.C.D. Weight=8–4–2–1 |
|---|---|
| 0 | 0 0 0 0 |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |

With four binary positions weighted according to the 8, 4, 2, 1 code, it is possible to represent $2^4$, or 16 characters altogether. Ordinarily, only ten weighted representations out of the sixteen possible representations are used, since that is all that is required to represent numeric 0, and 1 through 9.

To further emphasize the novelty of the present invention, however, each of the remaining six weighted B.C.D. configurations have been utilized to represent certain alphabetic characters. The alphabetic characters, which have been arbitrarily chosen for descriptive purposes and their B.C.D. representations are as follows:

*Table II*

| Alphabetic character: | B.C.D. Weight=8-4-2-1 |
|---|---|
| W | 1 0 1 0 |
| I | 1 1 0 1 |
| K | 1 0 1 1 |
| F | 1 1 0 0 |
| B | 1 1 1 0 |
| M | 1 1 1 1 |

Some of the numeric and alphabetic characters which may be displayed by appropriate set up of the embodiment shown in FIG. 1 are diagrammatically indicated in FIGS. 3a, b, c, d and e.

In order to form a particular numeric character, it is necessary to actuate only those code plates "8," "4," "2" or "1" which represent that character, in the B.C.D. code.

In FIG. 3a, for example, a "1" has been displayed by actuating the "1" plate which represents its B.C.D. equivalent.

Figure 3B:
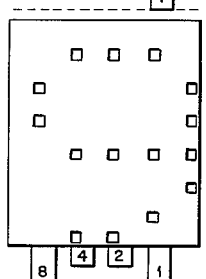

In FIG. 3b, the 9 has been formed by actuating the "8" and the "1" plates, which, again, represent the B.C.D. equivalent of 9.

All other numeric characters, that is: 2, 3, 4, 5, 6, 7 and 8 may be formed by suitable actuation of the code plate or plates which represent the B.C.D. weighted equivalent. Thus a "6" may be formed by actuating the 2 and the 4 plates.

Figure 3C:
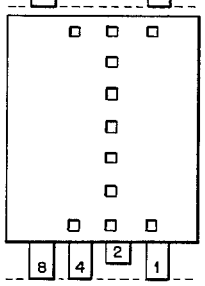
Figure 3D:
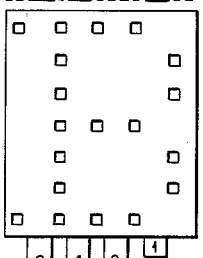
Figure 3E:
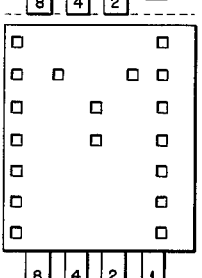

FIGS. 3c, d and e depict several of the alphabetic characters which may be formed on the device of FIG. 1 according to their arbitrary B.C.D. representations listed in Table II above. An "I" is arbitrarily formed by actuating the 8, 4, and 1 plates.

As was mentioned, a significant relationship exists in forming the numerical characters according to the B.C.D. weighted representation, since each numeric character is simply and directly formed by actuating the code plates which themselves correspond to the B.C.D. weighted values. No corresponding significance exists with respect to the formation of the six alphabetic characters shown in Table II for illustrative purposes, since the B.C.D. representations have been arbitrarily assigned.

Some significant relationship does exist however, with respect to alphabetic characters and their coded representations in an expanded embodiment of the invention to be presented later in this description.

In FIG. 2, it will be noted that with the code plates 8, 4, 2 and 1 in their upper or "restored" positions and with the code mask 18 fully inserted, light rays 23a, 24a, 25a, 26a and 27a pass through the mask and through all of the code plates from right to left and may thus emanate from the corresponding squares 23, 24, 25, 26 and 27 shown in FIG. 1.

Other light rays 37a which are directed to the display device will not pass through to an observer, since a portion of at least one code plate, or the code mask itself, lies in the respective paths of these rays.

It may be readily observed that if any one of the code plates is moved from its upper position to its lower actuated position a different configuration of light paths through the code mask and the code plates will be established.

A better understanding of the light-controlling principle on which the device shown in FIG. 1 and FIG. 2 operates may be obtained by referring to FIG. 4 in conjunction with FIGS. 5, 6, 7, 8 and 9.

FIG. 4 reveals that the display area ABCD of the preferred embodiment in FIG. 1 is actually composed of a matrix of thirty-five identical square areas, five horizontal squares wide by seven vertical squares high. If each of the thirty-five areas in the display area were one-inch square, a total display area 5" wide and 7" high would be formed.

For illustrative purposes, one of the squares AEFG has been enlarged and brought to the forefront of FIG. 4. The typical square AEFG has been subdivided into sixteen smaller square areas, numbered 1–16. If the square AEFG is 1" x 1" square, then each of the sixteen small areas will be ¼" x ¼" in size. All other 1" x 1" square areas within the display area ABCD may be subdivided in a manner similar to the subdivision of the square AEFG.

A novel aspect of the present invention lies in establishing light emanation from a different one, and only one, of the sixteen smaller squares in each of the thirty-five 1" x 1" squares, when any of the sixteen possible B.C.D. arrangements of the plates 8, 4, 2 and 1 is set up, and, in addition, in controlling the passage of the light through each of the sixteen resulting light path matrices with the code mask 18, so that, in the illustrative embodiment, sixteen different recognizable characters may be displayed.

Thus, if all plates 8, 4, 2, and 1 are in their home positions, light would ordinarily appear only in the smaller ¼" x ¼" square designated "0," in the upper left hand corner of the 1" x 1" square AEFG. Similarly, light would be apparent in each of the other thirty-four 1" x 1" squares only in the corresponding smaller ¼" x ¼" square designated "0".

If the B.C.D. 4 and 1 code plates, which corresponds to the decimal "5," were actuated, light would appear through the small ¼" x ¼" square designated "5" within the larger square AEFG in FIG. 4 and at the same time light would appear in a smaller ¼" and ¼" square having a corresponding position, within each of the other thirty-four square-inch areas.

It is evident that light may appear in a corresponding one of sixteen possible locations within each of the thirty-five square inch areas according to the B.C.D. set up selected.

Since no recognizable character would be formed by the appearance of light in a smaller square within all thirty-five of the one-inch squares, the code mask 18 is provided to block the passage of light through some of the thirty-five squares and to permit the passage of light through the remainder of the thirty-five squares, and in this manner a recognizable character outline is formed.

As an example, with all of the code plates in their restored positions, light would ordinarily pass through all of the small squares designated "0" in FIG. 4.

By means of the code mask 18, however, light is prevented from appearing in nineteen of the smaller squares designated 40 in FIG. 4 and light is permitted to pass through the squares designated 20–35, which correspond to the same 20–35 light squares previously pointed out in FIG. 1. A "0" is thus formed by masking out particular ones of the thirty-five "0" squares. Recognizable outlines of other characters are formed in a similar manner by masking out certain squares and permitting light to pass through other squares which alone are required to form the outlines of the respective characters.

A more detailed analysis of the establishment of the sixteen possible light squares within each of the thirty-five square inch areas may be realized by considering FIGS. 5, 6, 7, 8 and 9 which respectively depict the code plates 8, 4, 2 and 1 and the code mask.

Each of the code plates and the code mask would be positioned within the display device housing 1 in FIG. 1 so that the square portions AEFG on each of the plates and on the mask, which correspond to the AEFG square discussed in connection with FIG. 4 would lie in an overlapped coextensive relationship when all of the code plates are in their upper home positions.

Figure 5:
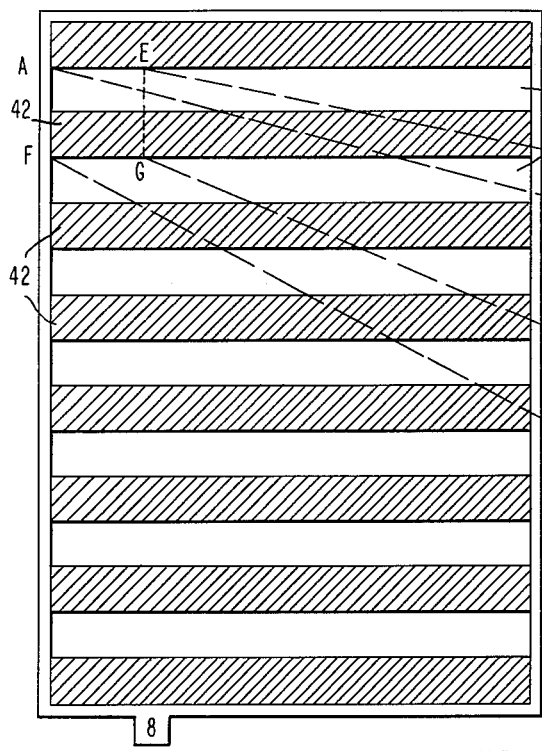

In FIG. 5, it will be noted that code plate 8 is formed of horizontal opaque bars 42 and horizontal open spaces 43 of equal dimension in an alternate bar-space, bar-space arrangement.

Figure 6:
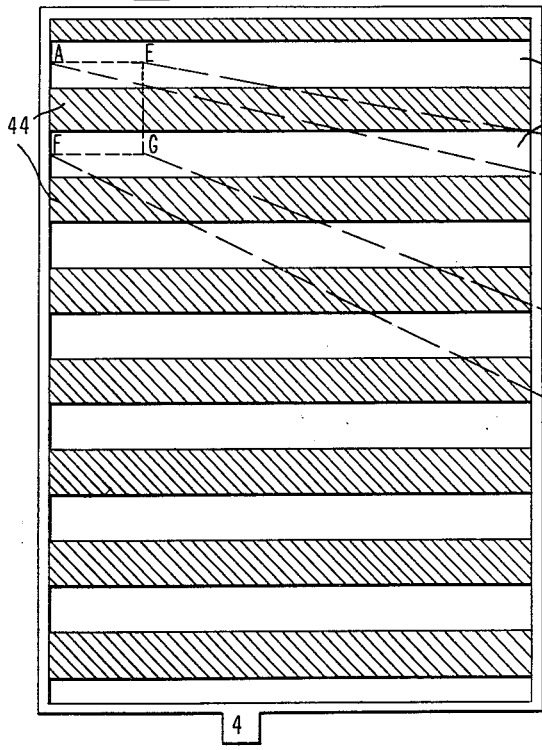

In FIG. 6, code plate 4 is similarly formed of horizontal opaque bars 44 and horizontal open spaces 43 of equal dimensions also arranged in an alternate manner.

A consideration of the respective enlarged AEFG areas of the code plates 8 and 4 shown in FIGS. 5 and 6 will reveal that the opaque area 42 of the plate 8 occupies the entire lower half of the square AEFG while the opaque area 44 of the code plate 4 occupies the middle half of the square AEFG.

Figure 7:
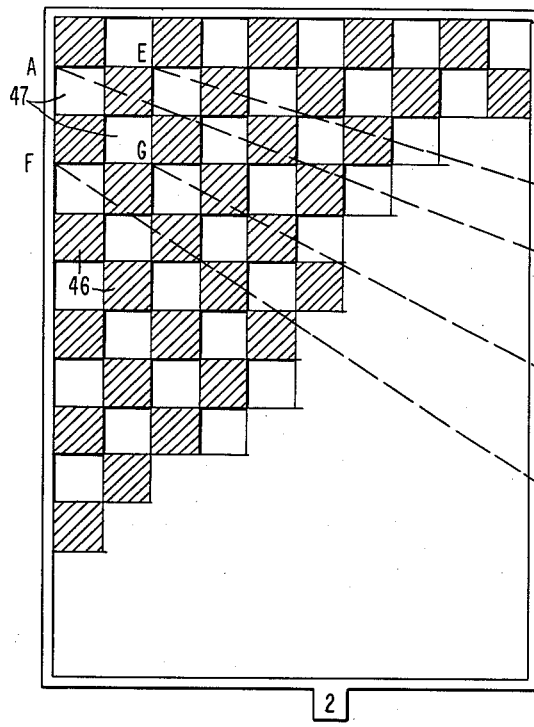
Figure 7:
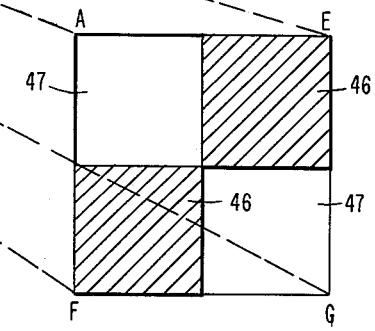
Figure 8:
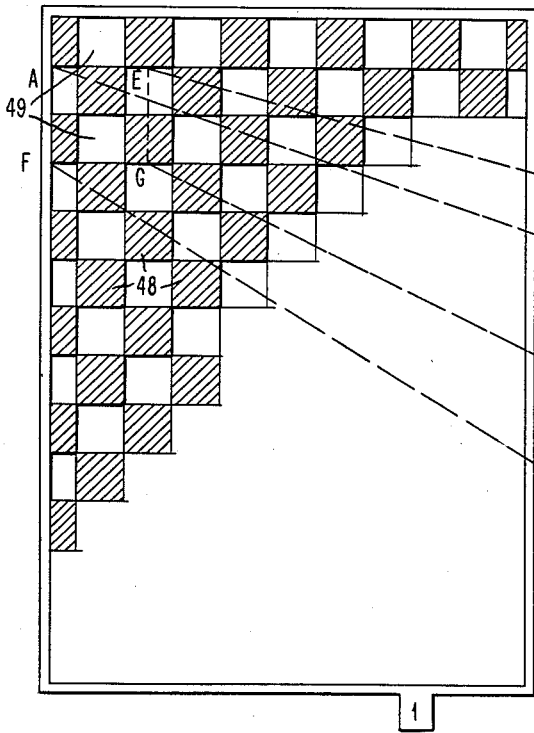
Figure 8:
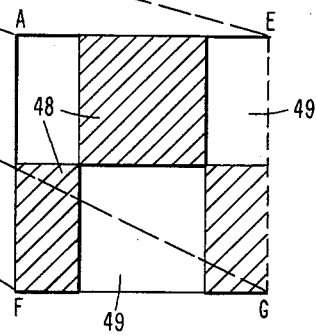

Referring to FIG. 7, code plate 2 is shown to be formed of opaque areas 46 and open areas 47 arranged in a checkerboard pattern. In FIG. 8, it may be seen that code plate 1 is similarly formed of opaque areas 48 and open areas 49, also arranged in a checkerboard pattern.

A comparison of the enlarged AEFG squares of the code plate 2 in FIG. 7 and the code plate 1 in FIG. 8 will reveal that the checkerboard pattern of code plate 1 is identical to that of code plate 2, but that it is displaced to the left ¼″, assuming that the squares AEFG are 1″ x 1″.

In FIG. 9, a square area AEFG is outlined on the code mask 18 which corresponds to the AEFG areas of the code plates 8, 4, 2, and 1. Within the square AEFG on the code mask 18 it will be noted that open areas 5, 7, 10, 11, 12, 14 and 15 are provided within the opaque material 50. Light would appear within the area AEFG only when the display device had been set up according to the B.C.D. equivalent of 5, 7, 10, 11, 12, 14 and 15 respectively.

Considering another area HJKL on the code mask 18 in FIG. 9, it will be evident that a configuration of open areas exists which is different from the configuration of open areas in the square AEFG. In the square HJKL, light could pass through the mask only when the display device was set up for the B.C.D. equivalents of the decimals 0, 3, 5, 6, 8, 10, 14 and 15.

The manner of establishing a particular one of the sixteen light areas within a one inch square may be derived from FIGS. 10, 11 and 12.

It will be noted that, for comparative and illustrative purposes, the square AEFG has again been selected. An observation of FIGS. 10a, b, c and d, will reveal that if the two code plates 8 and 4 alone are overlapped, it is possible to establish any one of four possible open areas 61, 62, 63, or 64 which extend the full width of the square AEFG by appropriate displacement of either or both of the code plates 8 and 4. With both plates 8 and 4 in their restored or upper position, the open area 61 will be formed, with code plate 8 in its restored position and code plate 4 in its actuated position, the open area 62 will be established, and so on.

Referring to FIGS. 11a, b, c and d, the relationship of code plates 2 and 1 alone is considered. It will be noted that two open areas always exist within the square AEFG when code plates 1 and 2 are displaced with respect to one another.

Thus, with both plates 1 and 2 in their restored positions, open areas 65 and 66 are established. If code plate 2 is left in its restored position and code plate 1 is moved down to its fully actuated position a different pair of light areas 67 and 68 are established.

In FIGS. 12a, b, c and d, all code plates 8, 4, 2 and 1 are considered in an overlapped relationship. FIGS. 12a, b, c and d are composite representations of the respective FIGURES 10a–11a, 10b–11b, 10c–11c, and 10d–11d, respectively.

It will be noted that if the plates 8 and 4, as represented in FIG. 10a and the plates 2 and 1, as represented in FIG. 11a are combined as shown in FIG. 12a, only one-sixteenth of the large square AEFG will remain open, that is the "0" position. Similarly, if the plates 8 and 4, as represented in FIG. 10b and the plates 2 and 1 as represented in FIG. 11b are combined as shown in FIG. 12b, a different, but only one, one-sixteenth square area, designated "5" will be open.

In a similar manner, all other fourteen small open square areas within a one-inch square may be established according to the diagram shown in FIG. 4, by appropriate positioning of the plates 8, 4, 2 and 1.

In addition, a corresponding open small square area will be established in all of the other thirty-four larger squares within the display area ABCD in FIG. 1, which correspond to the typical square AEFG.

A display device in which the basic principles of the present invention are enlarged, so that many more characters may be displayed, is illustrated in FIG. 13 and FIG. 14 in conjunction with FIG. 15 and FIG. 16.

The device of FIG. 13 operates on principles similar to those already discussed. Additional capacity has been achieved in the device of FIG. 13 by providing two additional code plates "A" and "B" which are evidenced by the "A" and "B" extensions at the lower end of the housing 81, in FIG. 13.

The plates A and B would be slidably positioned within the housing 81 like the code plates 8, 4, 2 and 1. A code mask CM would also be provided, as shown in FIG. 14. The details of the opaque and open areas within the typical square AEFG on code plates A and B may be derived from FIG. 15 and FIG. 16, respectively.

Each of the code plates A and B is formed of opaque areas and open areas arranged in particular and different checkerboard configurations.

It is apparent that if the squares AEFG on the two plates A and B are superimposed over the plates 8, 4, 2 and 1 in FIG. 12a, an area smaller than the previously discussed "0" area in FIG. 12a will remain open. The area which remains open will be $1/2^6$ or $1/64$ of the total AEFG area. By proper movement of all six code plates A, B, 8, 4, 2 and 1, any one of sixty-four possible small areas within the larger square AEFG may be selected and a similarly located small area will be open in each of the other thirty-four square areas which correspond to the area AEFG and which comprise the total display area ABCD in FIG. 13.

It will be apparent to those skilled in the art that a code mask CM similar to that of FIG. 9, may be easily formed to permit light to appear only where desired in any of the thirty-five light areas which appear with a particular A–B–8–4–2–1 combination, to thus establish a particular recognizable character. Since it is possible to form sixty-four different characters, it is apparent that besides the ten numeric and the twenty-six alphabetic characters in the English language, twenty-eight other special characters may be formed which, in all probability would satisfy most character display requirements. If a total of more than sixty-four different characters is required, it is only necessary to add another code plate having an appropriate opaque area-open area configuration to provide selection of any one of one hundred twenty-eight possible characters.

A code arrangement for establishing characters in a logical related manner with the expanded display device of FIG. 12 is shown in the following Table III.

Table III

| Numeric Character | A-B-8-4-2-1 Representation | Alphabetic Character | A-B-8-4-2-1 Representation | Spec. Char. | A-B-8-4-2-1 Representation |
|---|---|---|---|---|---|
| 0 | 0 0 0 0 0 0 | A | 1 1 0 0 0 1 | & | 1 1 0 0 0 0 |
| 1 | 0 0 0 0 0 1 | B | 1 1 0 0 1 0 | . | 1 1 1 0 1 1 |
| 2 | 0 0 0 0 1 0 | C | 1 1 0 0 1 1 |   | 1 1 1 1 0 0 |
| 3 | 0 0 0 0 1 1 | D | 1 1 0 1 0 0 |   | 0 1 0 0 0 0 |
| 4 | 0 0 0 1 0 0 | E | 1 1 0 1 0 1 | $ | 0 1 1 0 1 1 |
| 5 | 0 0 0 1 0 1 | F | 1 1 0 1 1 0 | * | 0 1 1 1 0 0 |
| 6 | 0 0 0 1 1 0 | G | 1 1 0 1 1 1 |   | 1 0 0 0 0 1 |
| 7 | 0 0 0 1 1 1 | H | 1 1 1 0 0 0 | / | 1 0 1 0 1 1 |
| 8 | 0 0 1 0 0 0 | I | 1 1 1 0 0 1 | , | 1 0 1 1 0 0 |
| 9 | 0 0 1 0 0 1 | J | 0 1 0 0 0 1 | % | 0 0 1 0 1 1 |
|   |   | K | 0 1 0 0 1 0 | # | 0 0 1 1 0 0 |
|   |   | L | 0 1 0 0 1 1 | @ |   |
|   |   | M | 0 1 0 1 0 0 |   |   |
|   |   | N | 0 1 0 1 0 1 |   |   |
|   |   | O | 0 1 0 1 1 0 |   |   |
|   |   | P | 0 1 0 1 1 1 |   |   |
|   |   | Q | 0 1 1 0 0 0 |   |   |
|   |   | R | 0 1 1 0 0 1 |   |   |
|   |   | S | 1 0 0 0 1 0 |   |   |
|   |   | T | 1 0 0 0 1 1 |   |   |
|   |   | U | 1 0 0 1 0 0 |   |   |
|   |   | V | 1 0 0 1 0 1 |   |   |
|   |   | W | 1 0 0 1 1 0 |   |   |
|   |   | X | 1 0 0 1 1 1 |   |   |
|   |   | Y | 1 0 1 0 0 0 |   |   |
|   |   | Z | 1 0 1 0 0 1 |   |   |

The A-B-8-4-2-1 representations shown in Table III are well known in the electronic computer art and form a convenient code for recording or storing character representations in various storage media such as magnetic tape, magnetic cores, on magnetic drums, or in paper tape or cards.

Only forty-seven characters with their corresponding A-B-8-4-2-1 representations are suggested in Table III. Seventeen other characters, up to the maximum capacity of the device of FIG. 13, might be included, or a total of sixty-four characters.

If any of the characters shown in Table III were stored in an electronic computer in the form suggested, it is apparent that they might be easily and directly read out or displayed without intermediate decoding means, by providing an appropriate code mask CM for the device in FIG. 13 and by actuating particular ones of the code plates A-B-8-4-2-1 according to the particular A-B-8-4-2-1 code configuration suggested in Table III.

As an example, a "6" might be displayed by actuating the 4 and the 2 code plates and by leaving the A-B-8 and 1 code plates in their restored positions. An "S" might be formed by actuating the A and the 2 code plates. The asterisk character (*) might be displayed by actuating the B, 8 and 4 code plates. The particular combination of actuated or non-actuated code plates would determine which of the sixty-four possible light path matrices would be established and the configuration of the code mask would determine which ones of the thirty-five light paths in a particular matrix would remain open to form a recognizable character.

Referring to FIG. 14, which is a symbolic cross-sectional representation of the device in FIG. 13, along the line 14—14, and referring to FIG. 13 itself, it will be noted that, in one possible configuration with all plates in the home or "0" position, light would be permitted to pass only through the openings 82 through 86 along the line 14—14 and would not be permitted to pass through the openings 87 and 88 on the line 14—14, because of the existence of opaque material in the code mask CM coextensive with those openings.

Since each character that is displayed is formed of small squares of light under control of the code mask, it may be desirable, for some applications, to enlarge the small squares of light so that a more readily recognizable character is formed. This may be performed by the auxiliary apparatus shown in FIG. 17. Light from a source 91 is directed through the openings 92 which are set up to display a "0" on a display device 93, similar to that of FIG. 1. A ground glass screen 94 is positioned to the right of the display device 93, some distance away.

Utilization of the natural diffusion of the light rays 95 as they pass through the openings 92, and the ground glass screen 94 results in a character "0" which is more easily recognized, since the light from any one of the openings 92 has been spread out until it blends with the light passing through the openings 92 on either side. A character with greater overall recognizable characteristics is thus formed.

In FIG. 18, the apparatus of FIG. 17 has been expanded so that a plurality of characters may be displayed simultaneously. Light from a light source 100 is directed through a directing screen 101 to a plurality of display devices 102.

A ground glass screen 103 provides a diffused display of the individual characters similar to that discussed in conjunction with the apparatus of FIG. 17. An entire word or numeric representation may be displayed by means of the device in FIG. 18 by setting up each of the individual display devices 102 to display the characters desired.

It is evident that the ground glass screen 103 is an auxiliary element only and that the characters formed may, depending on the size of the individual display devices 102, the intensity of the light source 100, and other factors, be easily recognized in most applications, without the use of such a screen.

It would be possible to dispense with the code masks shown in the various embodiments of the present invention herein by adding opaque areas on various ones of the individual code plates which would perform the character forming function of the code masks. However, an emmbodiment of this nature would not be as practical and useful as the preferred embodiments disclosed herein, since the character forming functions of the device would then be rigidly fixed. With the preferred embodiments shown herein, it is possible to change the character forming characteristics of the device by removing one code mask and by inserting another code mask having a different configuration of open and opaque areas. In addition, the individual code plates in the preferred embodiments disclosed herein can be easily manufactured since they have configurations of open and opaque areas which are not complex. Considerable complexity and less practical operation would result if the code mask were dispensed with.

On the basis of the foregoing discussion, it is apparent that display devices based on the principles of the present invention possess novel and useful features not found in prior art devices.

By actuating the code plates according to binary coded decimal representations, all equivalent decimal characters, 0 through 9, plus selected alphabetic and special characters may be simply and directly displayed.

It is evident that the display device of the present invention permits the elimination of intermediate decoding means when converting from a coded representation of a character to a recognizable conventional and readable character.

While the invention has been particularly shown and described with reference to preferred embodiments thereof, it will be understood by those skilled in the art that various changes in form and details may be made therein without departing from the spirt and scope of the invention.

What is claimed is:

1. A display device for deriving a recognizable character from a coded representation having a number of digital positions, comprising a display area composed of a matrix of sub areas, light means directed through said matrix toward a viewing position, a plurality of light interposer means coextensively arranged in stacked relationship with said display area and between said light source and display area, each of said interposer means respectively controlling passage of light through a binary weighted portion of each of said sub areas according to the binary weighted significance of a particular one of the digital positions in said coded representation, and each of said interposer means being simultaneously movable between a first light controlling position and a second light controlling position, actuating means for positioning each of said interposer means to its first position or to its second position according to the binary one and binary zero configuration of a particular coded representation, so that a particular light path matrix is established on said display area, and masking means for further controlling passage of light through the individual paths of said established matrix, whereby a recognizable character corresponding to the said particular coded representation is formed.

2. The device of claim 1, wherein the display area, and the light interposer means are contained within a housing and wherein the means for controlling passage of light through said established matrix, is insertable within said housing.

3. The device of claim 1 wherein a ground glass screen is provided between the display area and the viewing position.

4. A display device for deriving a recognizable character from a binary coded decimal representation having four digital positions respectively designated 8–4–2–1, comprising a display area composed of a matrix of sub areas, light means directed through said matrix toward a viewing position, a plurality of light interposer means coextensively arranged within said display area, each of said interposer means respectively controlling passage of light through a binary weighted portion of each of said sub areas according to the binary weighted significance of a particular one of the 8–4–2–1 digital positions in said coded representations, and each of said interposer means being movable between a first light controlling position and a second light controlling position, actuating means for positioning each of said interposer means in its first position if a binary one exists in the corresponding digital position of a particular coded representation and in its second position if a binary zero exists in the corresponding digital position of said particular coded representation, so that a particular light path matrix is established within said display area, and means for controlling passage of light through the individual paths of any established matrix, whereby a recognizable character corresponding to the particular coded representation is formed.

5. The device of claim 4 wherein the binary coded decimal representation has six digital positions respectively designated A–B–8–4–2–1.

6. A device for displaying a plurality of recognizable characters from a corresponding plurality of coded representations, each of which has a number of digital positions, comprising a display area composed of sections, each of which is associated with an individual character to be displayed and each of which consists of a matrix of sub areas, common light means directed through the individual sections of said display area to a position of observation, individual sets of light interposer means coextensively arranged with each section of said display area, each of the interposer means of a set controlling passage of light through a binary weighted portion of each sub area in its section according to the binary weighted significance of a particular one of the digital positions in a coded representation, and each of said interposer means in a set being movable between a first light controlling position and a second light controlling position, actuating means for positioning each of said interposer means in a set to its first position or to its second position according to the binary one and binary zero coded representation of a particular configuration, so that a particular light path matrix is established within that section of said display area, and means for controlling the passage of light in the individual paths of any established matrix in the various sections, whereby a plurality of recognizable characters corresponding to a plurality of selected coded representations is formed.

7. A display device, for deriving a recognizable character from a coded representation having a number of digital positions, comprising a display area composed of a matrix of predefined standard sub areas, a plurality of light interposer plates respectively representative of each of the digital positions in said code, and coextensively arranged in superimposed relationship with said display area, and movable between a first and a second position, each of said plates having a particular configuration of open areas and opaque areas for controlling passage of light through each of said sub areas, a first one of said plates controlling light passage through a binary $1/2^n$ portion of each of said sub areas when in a first position and a different binary $1/2^n$ portion of each of said sub areas when in a second position, a second one of said plates controlling light passage through $1/2^{n+1}$ portion of each of said sub areas when in a first position and a different $1/2^{n+1}$ portion of each of said sub areas when in a second position, and each of the remaining plates controlling passage of light through a $1/2^{n+k}$ portion of each of said sub areas when in a first position and a different $1/2^{n+k}$ portion of each of said sub areas when in a second position, so that a plurality of light path matrices may be established corresponding in number to the total possible binary positional combinations of said plates, actuating means for positioning each of said plates to its first position or to its second position according to the binary one-binary zero configuration of a particular coded representation, whereby a particular one of said light matrices is established, and preselected masking means for controlling passage of light through the light paths of any established matrix so that a recognizable character corresponding to the particular coded representation is formed.

References Cited in the file of this patent

UNITED STATES PATENTS

| | | |
|---|---|---|
| 609,915 | Sibley | Aug. 30, 1898 |
| 1,172,360 | Heldburgh | Feb. 22, 1916 |
| 2,163,188 | Bosche | June 20, 1939 |
| 2,755,996 | Williams | July 24, 1956 |
| 2,756,931 | Drillick | July 31, 1956 |
| 2,774,821 | Brown et al. | Dec. 18, 1956 |
| 2,790,088 | Shive | Apr. 23, 1957 |
| 2,807,728 | Kilburn | Sept. 24, 1957 |
| 2,982,038 | Kass | May 2, 1961 |

FOREIGN PATENTS

| | | |
|---|---|---|
| 1,247,600 | France | Jan. 29, 1960 |